United States Patent
Yin et al.

(10) Patent No.: US 9,215,664 B2
(45) Date of Patent: Dec. 15, 2015

(54) METHOD AND APPARATUS FOR POWER CONTROL

(71) Applicant: Huawei Technologies Co., Ltd., Shenzhen, Guangdong (CN)

(72) Inventors: Jianhong Yin, Shanghai (CN); Anhua Mei, Shanghai (CN); Jiaji Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 52 days.

(21) Appl. No.: 14/299,610

(22) Filed: Jun. 9, 2014

(65) Prior Publication Data

US 2014/0364163 A1    Dec. 11, 2014

(30) Foreign Application Priority Data

Jun. 9, 2013   (CN) .......................... 2013 1 0231001

(51) Int. Cl.
  *H04B 7/00*   (2006.01)
  *H04W 52/16*  (2009.01)
  *H04W 52/14*  (2009.01)
  *H04W 52/42*  (2009.01)

(52) U.S. Cl.
  CPC ............ *H04W 52/16* (2013.01); *H04W 52/146* (2013.01); *H04W 52/42* (2013.01)

(58) Field of Classification Search
  CPC .... H04W 52/16; H04W 52/146; H04W 52/42
  See application file for complete search history.

(56) References Cited

U.S. PATENT DOCUMENTS

| | | | | |
|---|---|---|---|---|
| 2013/0281148 A1* | 10/2013 | Seyama | ............... | H04W 52/243 455/522 |
| 2014/0029582 A1* | 1/2014 | Chin | ................... | H04W 52/146 370/336 |
| 2014/0099988 A1* | 4/2014 | Boppana | ............. | H04W 52/146 455/522 |
| 2015/0124737 A1* | 5/2015 | Lee | ........................ | H04W 52/28 370/329 |
| 2015/0156728 A1* | 6/2015 | Kwon | ................... | H04W 52/16 370/329 |

* cited by examiner

*Primary Examiner* — Edward Urban
*Assistant Examiner* — Mohammed Rachedine

(57) ABSTRACT

The present invention relates to a power control method, including: obtaining a current main carrier power of a main carrier and a current supplementary carrier power of a supplementary carrier; selecting a reference carrier from the main carrier and the supplementary carrier; calculating a difference between the main carrier power and the supplementary carrier power to obtain a first difference; determining a quantized value corresponding to the first difference by querying a preset configuration parameter table according to the first difference; and determining, according to the power of the reference carrier and the quantized value, a total transmit power for transmitting the main carrier and the supplementary carrier. In the whole process, a power of a previous timeslot does not need to be introduced, therefore, error accumulation can be avoided, thereby reducing a power control error and improving control precision.

10 Claims, 3 Drawing Sheets

METHOD AND APPARATUS FOR POWER CONTROL

CROSS-REFERENCE TO RELATED APPLICATION

This application claims priority to Chinese Patent Application No. 201310231001.2, filed on Jun. 9, 2013, which is hereby incorporated by reference in its entirety.

TECHNICAL FIELD

The present invention relates to the communications field, and in particular, to a method and an apparatus for power control.

BACKGROUND

A dual cell high speed uplink packet access (Dual Cell High Speed Uplink Packet Access, DC-HSUPA) technology is a new technology that combines a dual cell (DC) technology and a high speed uplink packet access (HSUPA) technology, and greatly increases an uplink rate peak of a user by allowing a user equipment (User Equipment, UE) to send HSUPA data in two concentric cells with different frequencies and using binary phase shift keying (Binary Phase Shift Keying, BPSK) or 16 quadrature amplitude modulation (16 Quadrature Amplitude Modulation, 16QAM), thereby ensuring that the user can upload data at a high rate.

To ensure uplink performance, an uplink power needs to be controlled. In the prior art, when the uplink power is controlled, all channels where two carriers are located are combined to calculate a total transmit power.

FIG. 1 is a principle diagram of power control in the prior art. After calculation is performed on network adjustment power parameters of a network side for two carriers by using a certain algorithm, and with reference to a difference between gains of all channels of a current timeslot and gains of all channels of a previous timeslot, and a total transmit power of the previous timeslot, the three are summed as a total transmit power of the current timeslot. The total transmit power of the current timeslot also serves as a reference value of a total transmit power of a next timeslot.

The method is disadvantageous in that an error of a previous timeslot is introduced each time the total power is calculated, and as the number of times of transmission increases, the error accumulates continuously, resulting in lowered precision of power control.

SUMMARY

An objective of the present invention is to provide a dual cell high speed uplink packet access power control method, so as to solve a problem in the prior art that precision of power control is affected by a continuously accumulating error when a total transmit power is controlled.

According to a first aspect, the present invention provides a power control method, including:

obtaining a current main carrier power of a main carrier and a current supplementary carrier power of a supplementary carrier;

selecting a reference carrier from the main carrier and the supplementary carrier;

calculating a difference between the main carrier power and the supplementary carrier power to obtain a first difference;

determining a quantized value corresponding to the first difference by querying a preset configuration parameter table according to the first difference, where the configuration parameter table includes a mapping relationship between the first difference and a second difference, the second difference is a difference between a preset total power of the main carrier and the supplementary carrier and a greater carrier power in the main carrier power and the supplementary carrier power, and the quantized value is a fixed value obtained by quantization of the second difference corresponding to the first difference; and determining, according to the power of the reference carrier and the quantized value, a total transmit power for transmitting the main carrier and the supplementary carrier.

Based on the first aspect, in a first possible implementation manner, when the reference carrier is a carrier with a greater power in the main carrier and the supplementary carrier, the determining a total transmit power according to the power of the reference carrier and the quantized value is specifically:

using a sum of the power of the reference carrier and the quantized value as the total transmit power.

Based on the first aspect, in a second possible implementation manner, when the reference carrier is a carrier with a smaller power in the main carrier and the supplementary carrier, the determining a total transmit power according to the power of the reference carrier and the quantized value is specifically:

using a sum of the power of the reference carrier, the difference between the main carrier power and the supplementary carrier power, and the quantized value as the total transmit power.

Based on the first aspect, or the first possible implementation manner of the first aspect, or the second possible implementation manner of the first aspect, in a third possible implementation manner, the configuration parameter table is established in the following manner:

presetting a same initial value for the power of the main carrier and the power of the supplementary carrier;

maintaining the power of one carrier at the initial value and increasing gradually the power of the other carrier;

converting powers of the two carriers from a decibel dB domain to a linear domain separately, summing total powers of the two carriers in the linear domain, and converting a summation result to the dB domain, so as to obtain a total power of the two carriers in the dB domain;

establishing a mapping relationship between the first difference and the second difference; and dividing the first difference into at least one interval and in each interval, quantizing the second difference to obtain a quantized value, so as to establish the configuration parameter table.

Based on the third possible implementation manner of the first aspect, in a fourth possible implementation manner, the second difference has a value range of 0 to 3 decibels.

Based on the first to fourth possible implementation manners of the first aspect, in a fifth possible implementation manner, the power control method is applied to a dual cell high speed uplink packet access network.

According to a second aspect, an embodiment of the present invention provides a power control apparatus, where the apparatus includes:

an obtaining unit, configured to obtain a main carrier power of a main carrier and a supplementary carrier power of a supplementary carrier;

a selecting unit, configured to select a reference carrier from the main carrier and the supplementary carrier;

a difference calculating unit, configured to calculate a difference between the main carrier power and the supplementary carrier power to obtain a first difference;

a query unit, configured to obtain a quantized value corresponding to the first difference by querying a preset configuration parameter table according to the first difference; and a power calculating unit, configured to determine, according to the power of the reference carrier and the quantized value, a total transmit power for transmitting the main carrier and the supplementary carrier.

Based on the second aspect, in a first possible implementation manner, the reference carrier is a carrier with a greater power; and the power calculating unit is specifically configured to:

use a sum of the power of the reference carrier and the quantized value as the total transmit power.

Based on the second aspect, in a second possible implementation manner, the reference carrier is a carrier with a smaller power in the main carrier and the supplementary carrier; and the power calculating unit is specifically configured to:

use a sum of the power of the reference carrier, the difference between the main carrier power and the supplementary carrier power, and the quantized value as the total transmit power.

Based on the second aspect, or the first possible implementation manner of the second aspect, or the second possible implementation manner of the second aspect, in a third possible implementation manner, the configuration parameter table includes a mapping relationship between the first difference and a second difference, the second difference is a difference between a preset total power of the main carrier and the supplementary carrier and a greater carrier power in the main carrier power and the supplementary carrier power, and the quantized value is a fixed value obtained by quantization of the second difference corresponding to the first difference.

In the dual cell high speed uplink packet access power control method provided by embodiments of the present invention, after a main carrier power of a main carrier and a supplementary carrier power of a supplementary carrier are obtained, a reference carrier is selected from the main carrier and the supplementary carrier; then, a difference between the main carrier power and the supplementary carrier power is obtained; a quantized value is determined according to the difference; and finally, a total transmit power is determined according to the power of the reference carrier and the quantized value. In the whole process, a power of a previous timeslot does not need to be introduced, therefore, error accumulation can be avoided, thereby reducing a power control error and improving control precision. In addition, when a carrier receives external interference, it can be ensured, by simply adjusting DPCCH powers of the two carriers by a network side, that a power difference of the two carriers is restricted within a set threshold range, thereby achieving a strong self-recovery capability.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following further describes the technical solutions of the present invention in detail with reference to the accompanying drawings and embodiments.

In a linear domain, a total power of dual carriers is equal to a sum of total powers of the two carriers. The power of each carrier is a sum of a dedicated physical control channel (Dedicated Physical Control Channel, DPCCH) power and gains of all channels of the carrier, therefore, a power difference between the two carriers may be continuously changed by maintaining the power of one carrier unchanged and changing the power value of the other carrier. In addition, each time after the power difference between the two carriers is changed, a difference between the total power of the two carriers and the power of a carrier with a greater power in the two carriers is calculated, and the difference may be used as a quantized value when the total power of the two carriers with a same power difference is calculated. After a large number of sets of data are obtained by calculation, a database is established, which may be configured in a user equipment, so that each time the total power needs to be controlled, table lookup is performed according to a difference corresponding to the power difference between the two carriers, so as to determine a quantized value.

Figure 1:
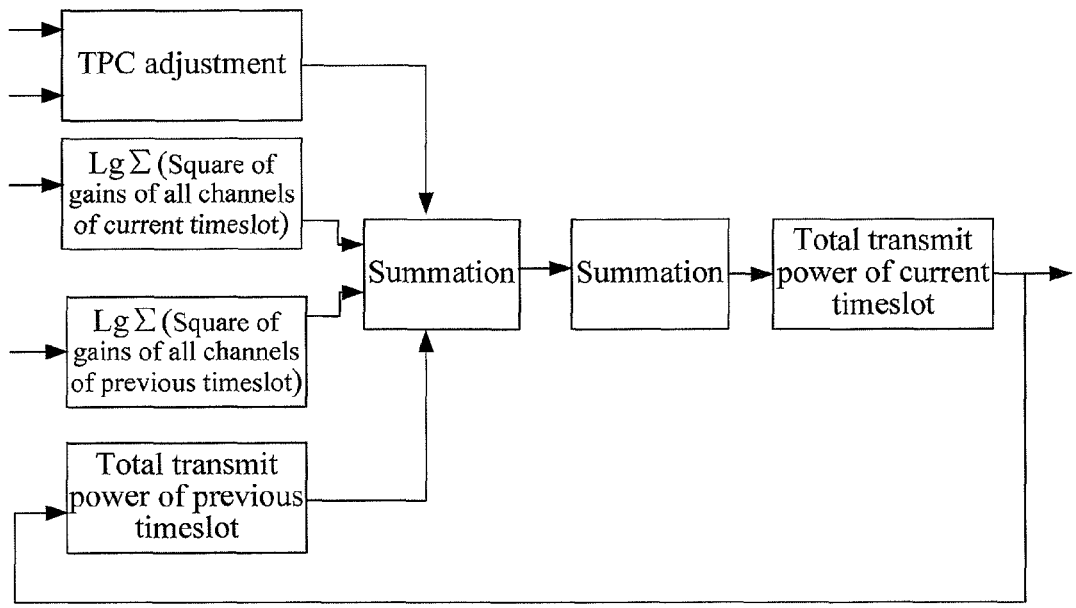
FIG. 1 is a principle diagram of controlling a total transmit power by a terminal in the prior art.
Figure 2:
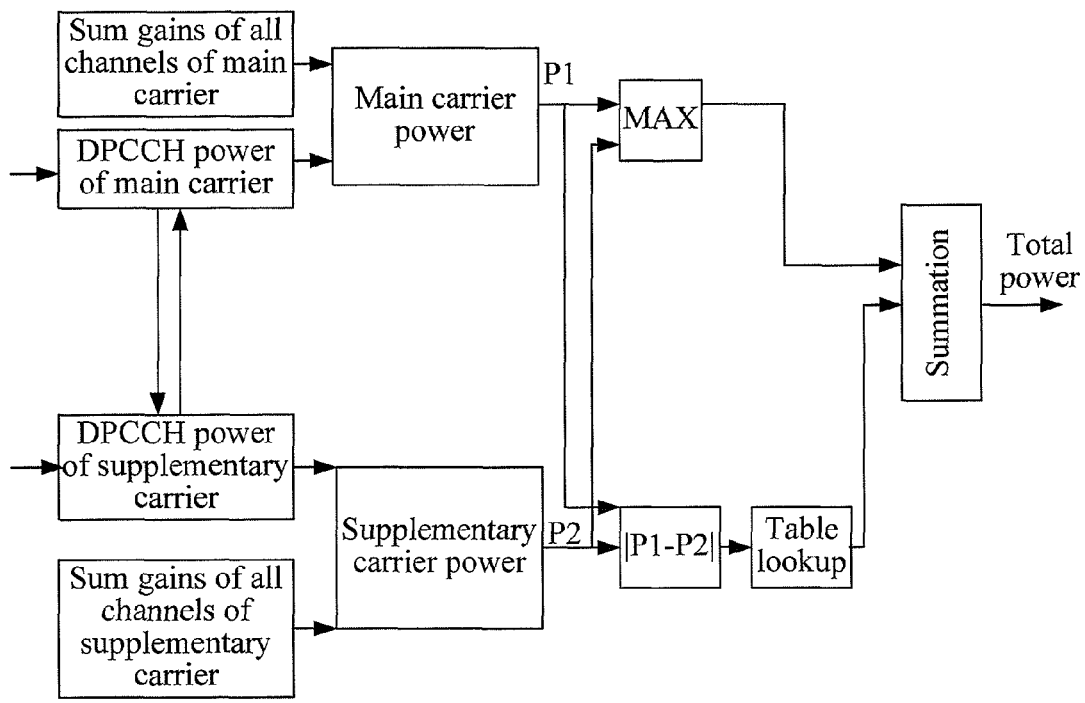
FIG. 2 is a principle architecture diagram of controlling a total transmit power of a terminal according to an embodiment of the present invention.

As shown in FIG. 2, in an embodiment of the present invention, a power of each carrier in two carriers is calculated by using the prior art, and by using an existing algorithm, a network side delivers a transmit power control (Transmit Power Control, TPC) parameter to restrict transmit powers of the two carriers, so that a difference between the two carriers is restricted within a certain range. Then, a total transmit power of a terminal is determined by using a dual cell high speed uplink packet access power control method provided by an embodiment shown in FIG. 3.

Figure 3:
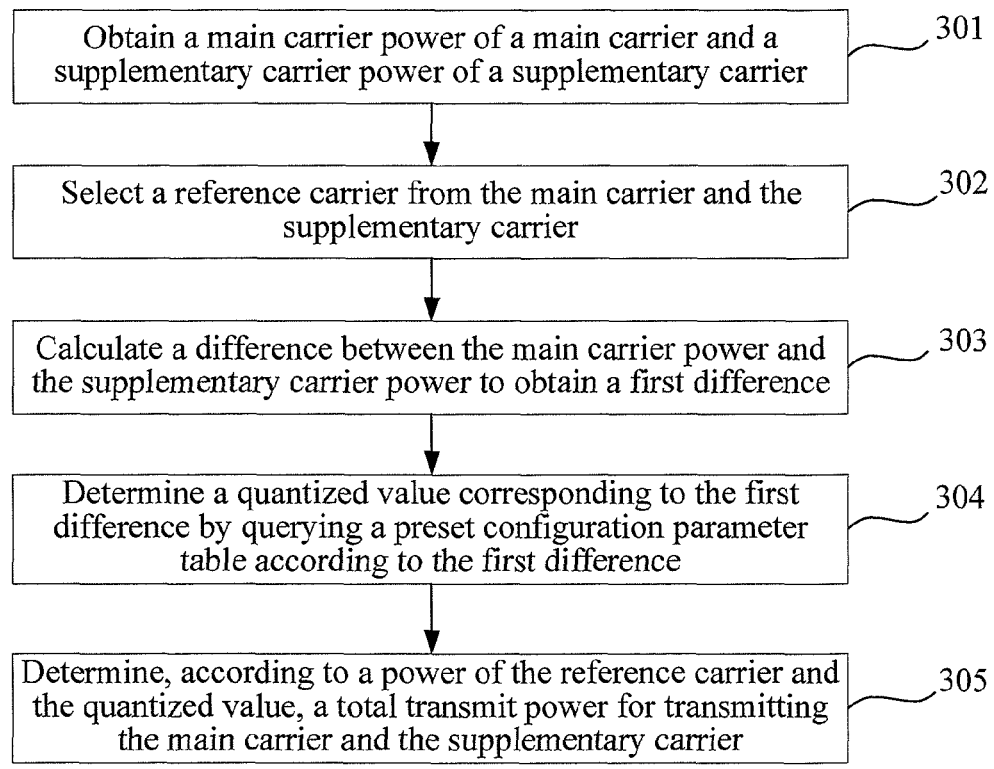
FIG. 3 is a flowchart of an embodiment of a power control method according to an embodiment of the present invention.

As shown in FIG. 3, a dual cell high speed uplink packet access power control method provided by an embodiment of the present invention includes:

301: Obtain a current main carrier power of a main carrier and a current supplementary carrier power of a supplementary carrier.

Specifically, the main carrier power of the main carrier P1 may be obtained based on the prior art, and the main carrier power is a sum of a DPCCH power of the main carrier and gains of all channels of the main carrier, where the DPCCH power of the main carrier is determined by a transmit power control parameter TPC1 of the main carrier delivered by a network side. Similarly, the supplementary carrier power of the supplementary carrier P2 may be obtained based on the prior art, and the supplementary carrier power is formed by a sum of a DPCCH power of the supplementary carrier and gains of all channels of the supplementary carrier, where the DPCCH power of the supplementary carrier is determined by a transmit power control parameter TPC2 of the supplementary carrier delivered by the network side. The network side may control a difference between the DPCCH power of the main carrier and the DPCCH power of the supplementary carrier to be less than 18 dB by using TPC1 and TPC2.

302: Select a reference carrier from the main carrier and the supplementary carrier.

Specifically, after obtaining the main carrier power P1 and the supplementary carrier power P2 by calculation, a user equipment selects a reference carrier. A carrier with a greater power or a carrier with a smaller power may be selected as the reference carrier. When the main carrier is selected as the reference carrier, the power of the reference carrier is P1, and similarly, when the supplementary carrier is selected as the reference carrier, the power of the reference carrier is P2.

303: Calculate a difference between the main carrier power and the supplementary carrier power to obtain a first difference.

Specifically, a power difference between the two carriers can be obtained according to the main carrier power P1 and the supplementary carrier power P2 that are obtained in step 301.

304: Determine a quantized value corresponding to the first difference by querying a preset configuration parameter table according to the first difference.

Specifically, after the difference |P1−P2| between the two carriers is determined, a quantized value in an interval corresponding to the difference is queried for in the configuration parameter table in a database configured by a terminal.

The configuration parameter table includes a mapping relationship between the first difference and a second difference, the second difference is a difference between a preset total power of the main carrier and the supplementary carrier and a greater carrier power in the main carrier power and the supplementary carrier power, and the quantized value is a fixed value obtained by quantization of the second difference corresponding to the first difference. A person skilled in the art should understand that the quantized value in this embodiment refers to a fixed value obtained by quantization of an actual value of the second difference corresponding to a certain interval of the first difference. The actual value of the second difference may change continuously, and reference may be made to FIG. 4. Specifically, the fixed value obtained by quantization may be obtained by averaging the actual value that changes continuously in the interval, so as to minimize an error between the quantized value and the actual value. Alternatively, the fixed value may be determined by using other mathematical and statistical methods such as root mean square, which is not limited in this embodiment.

305: Determine, according to the power of the reference carrier and the quantized value, a total transmit power for transmitting the main carrier and the supplementary carrier.

Specifically, since the reference carrier is already determined in step 302, different manners of determining the total transmit power according to the power of the reference carrier and the quantized value in step 305 may be used according to different criteria for selecting the reference carrier.

If the reference carrier selected by the terminal is a carrier with a greater power in the two carriers, the terminal uses a sum of the power of the reference carrier and the quantized value as the total transmit power.

If the reference carrier selected by the terminal is a carrier with a smaller power in the two carriers, the terminal uses a sum of the power of the reference carrier, the difference between the main carrier power and the supplementary carrier power, and the quantized value as the total transmit power.

The configuration parameter table may be established in the following manner:

setting power a same initial value for the main carrier and the supplementary carrier;

maintaining the power of one carrier unchanged and increasing gradually the power of the other carrier, where step precision is controlled according to a demand (0.1 dB is recommended), and increasing gradually refers to that the power of the other carrier is increased by a corresponding step each time compared with the previous time;

converting powers of the two carriers from a decibel dB domain to a linear domain separately, summing total powers of the two carriers in the linear domain, and converting a summation result to the dB domain, so as to obtain a total power of the two carriers in the decibel dB domain;

establishing a mapping relationship between the first difference and the second difference, where specifically, the first difference is the difference between the main carrier power and the supplementary carrier power, and the second difference is the difference between the total power and a greater carrier power; and dividing the first difference into at least one interval, and in each interval, quantizing the second difference to obtain a quantized value, so as to establish the configuration parameter table.

Figure 4:
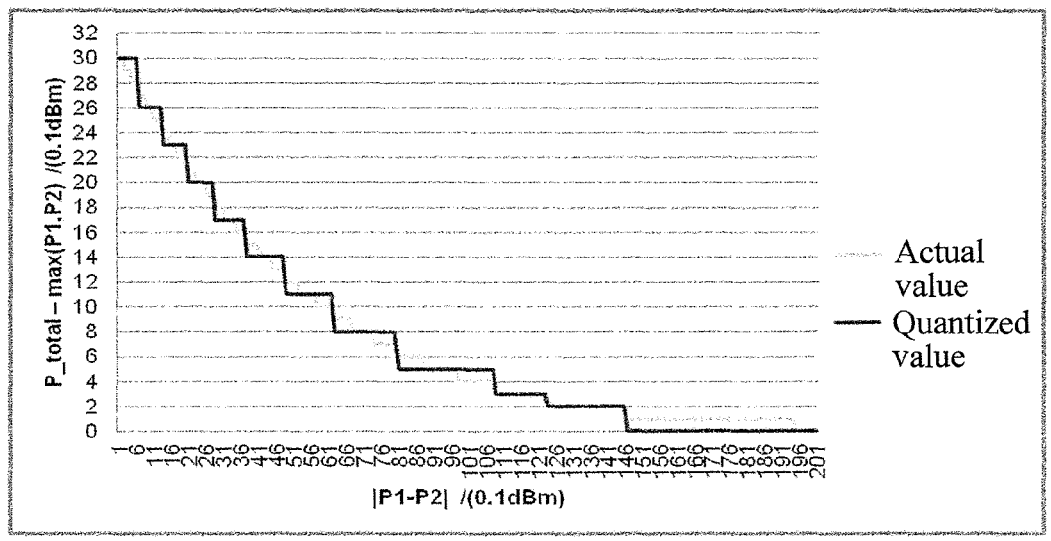
FIG. 4 is a schematic reference diagram of a configuration parameter table.

As shown in FIG. 4, the difference between the total power and the greater carrier power is 0 db to 0.3 db. "The difference between the main carrier power and the supplementary carrier power" is divided into intervals, and it can be found in each interval that the difference between the total power and the greater carrier power can be quantized as a fixed value (with an error range of 0.1 dB). Mapping relationship between the difference between the main carrier power and the supplementary carrier power and the difference between the total power and the greater carrier power is established, so as to establish the configuration parameter table.

In the power control method provided by the embodiment of the present invention, after a main carrier power of a main carrier and a supplementary carrier power of a supplementary carrier are obtained, a reference carrier is selected according to values of the main carrier power and the supplementary carrier power; then, a difference between the main carrier power and the supplementary carrier power is obtained; a quantized value is determined according to the difference; and finally, a total transmit power is determined according to the power of the reference carrier and the quantized value. In the whole process, a power of a previous timeslot does not need to be introduced, therefore, error accumulation can be avoided, thereby reducing a power control error and improving control precision. In addition, when a carrier receives external interference, it can be ensured, by simply adjusting DPCCH powers of the two carriers by a network side, that a power difference of the two carriers is restricted within a set threshold range, thereby achieving a strong self-recovery capability.

Figure 5:
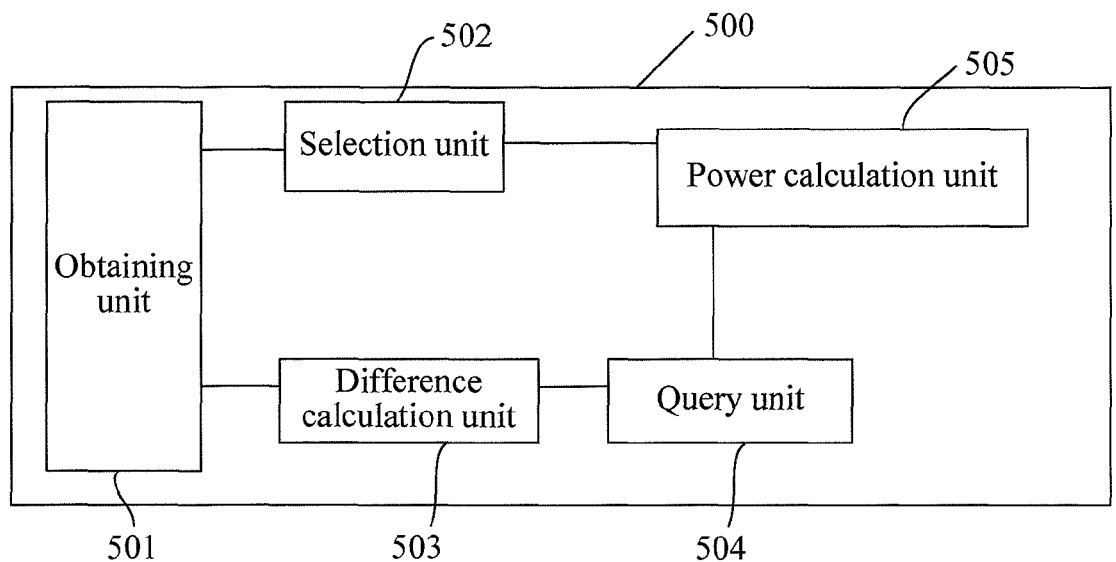
FIG. 5 is a structural diagram of an embodiment of a power control apparatus according to an embodiment of the present invention.

Accordingly, an embodiment of the present invention further provides a dual cell high speed uplink packet access power control apparatus 500. The apparatus may be a user equipment such as a mobile phone. FIG. 5 is a schematic structural diagram of the apparatus 500, including:

an obtaining unit 501, configured to obtain a main carrier power of a main carrier and a supplementary carrier power of a supplementary carrier;

a selecting unit 502, configured to select a reference carrier from the main carrier and the supplementary carrier;

a difference calculating unit 503, configured to calculate a difference between the main carrier power and the supplementary carrier power to obtain a first difference;

a query unit 504, configured to obtain a quantized value corresponding to the first difference by querying a preset configuration parameter table according to the first difference; and a power calculating unit 505, configured to determine, according to the power of the reference carrier and the quantized value, a total transmit power for transmitting the main carrier and the supplementary carrier.

If the reference carrier selected by the selecting unit 502 is a carrier with a greater power in the main carrier and the supplementary carrier, the power calculating unit 505 uses a sum of the power of the reference carrier and the quantized value as the total transmit power.

If the reference carrier selected by the selecting unit 502 is a carrier with a smaller power in the main carrier and the supplementary carrier, the power calculating unit 505 uses a sum of the power of the reference carrier, the difference between the main carrier power and the supplementary carrier power, and the quantized value as the total transmit power.

In the foregoing manner, after obtaining a main carrier power of a main carrier and a supplementary carrier power of a supplementary carrier, a terminal selects a reference carrier according to values of the main carrier power and the supplementary carrier power; then, obtains a difference between the main carrier power and the supplementary carrier power; determines a quantized value according to the difference; and finally, determines a total transmit power according to the power of the reference carrier and the quantized value. In the whole process, a power of a previous timeslot does not need to be introduced, therefore, error accumulation can be avoided, thereby reducing a power control error and improving control precision. In addition, when a carrier receives external interference, it can be ensured, by simply adjusting DPCCH powers of the two carriers by a network side, that a power difference of the two carriers is restricted within a set threshold range, thereby achieving a strong self-recovery capability.

Figure 6:
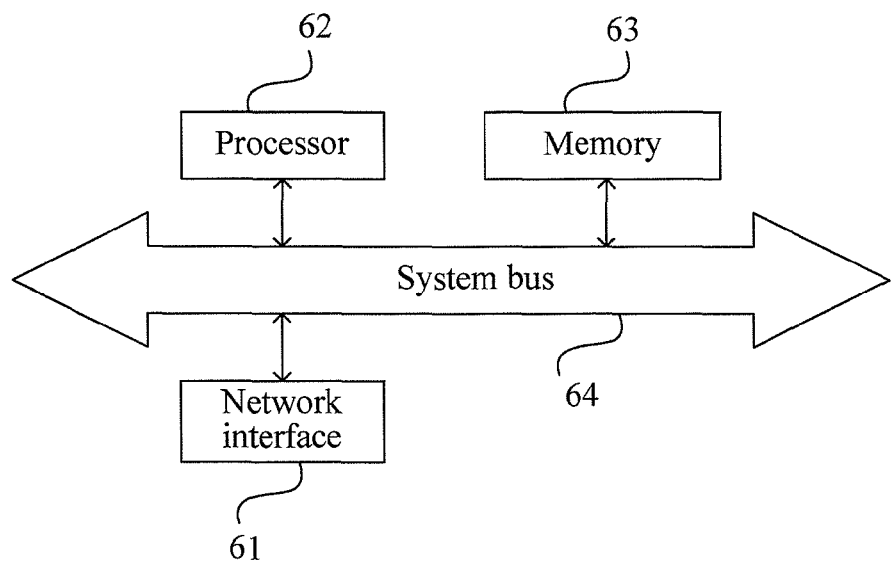
FIG. 6 is a structural diagram of another embodiment of a power control apparatus according to an embodiment of the present invention.

Accordingly, an embodiment of the present invention further provides a dual cell high speed uplink packet access power control apparatus. The apparatus may be a user equipment such as a mobile phone. FIG. 6 is a schematic structural diagram of the apparatus. As shown in the figure, this embodiment includes a network interface 61, a processor 62, a memory 63, and a system bus 64. The system bus 64 is configured to connect the network interface 61, the processor 62, and the memory 63.

The network interface 61 is configured to connect to a base station on a network side or other external devices.

The memory 63 may be a permanent memory, such as a hard disk drive or a flash memory. The memory 63 has a software module and a device driver. The software module can execute all functional in the foregoing method of the present invention, and the device driver may be a network interface driver.

When started, the software components are loaded into the memory 63, and then are accessed by the processor 62 and execute the following instructions:

obtaining a current main carrier power of a main carrier and a current supplementary carrier power of a supplementary carrier;

selecting a reference carrier from the main carrier and the supplementary carrier;

calculating a difference between the main carrier power and the supplementary carrier power to obtain a first difference;

determining a quantized value corresponding to the first difference by querying a preset configuration parameter table according to the first difference, where the configuration parameter table includes a mapping relationship between the first difference and a second difference, the second difference is a difference between a preset total power of the main carrier and the supplementary carrier and a greater carrier power in the main carrier power and the supplementary carrier power, and the quantized value is a fixed value obtained by quantization of the second difference corresponding to the first difference; and determining, according to the power of the reference carrier and the quantized value, a total transmit power for transmitting the main carrier and the supplementary carrier.

In the foregoing manner, after obtaining a main carrier power of a main carrier and a supplementary carrier power of a supplementary carrier, a terminal selects a reference carrier according to values of the main carrier power and the supplementary carrier power; then, obtains a difference between the main carrier power and the supplementary carrier power; determines a quantized value by table lookup according to the difference; and then, if the processor 62 selects a carrier with a greater power as the reference carrier, the processor 62 uses a sum of the power of the reference carrier and the quantized value as the total transmit power; and if the processor 62 selects a carrier with a smaller power in the main carrier and the supplementary carrier as the reference carrier, the processor 62 uses a sum of the power of the reference carrier, the difference between the main carrier power and the supplementary carrier power, and the quantized value as the total transmit power.

In the foregoing manner, in the whole process of power control by the terminal, a power of a previous timeslot does not need to be introduced, therefore, error accumulation can be avoided, thereby reducing a power control error and improving control precision. In addition, when a carrier receives external interference, it can be ensured, by simply adjusting DPCCH powers of the two carriers by a network side, that a power difference of the two carriers is restricted within a set threshold range, thereby achieving a strong self-recovery capability.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In combination with the embodiments disclosed in this specification, method or algorithm steps may be implemented by hardware, a software module executed by a processor, or a combination thereof. The software module may be installed in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The foregoing specific embodiments clarify the objective, technical solutions, and beneficial effects of the present invention in detail. It should be understood that the foregoing descriptions are merely specific embodiments of the present invention, but are not intended to limit the protection scope of the present invention. Any modification, equivalent replacement, or improvement made without departing from the spirit and principle of the present invention should fall within the protection scope of the present invention.

What is claimed is:

1. A power control method, comprising:
obtaining a current main carrier power of a main carrier and a current supplementary carrier power of a supplementary carrier;
selecting a reference carrier from the main carrier and the supplementary carrier;
calculating a difference between the main carrier power and the supplementary carrier power to obtain a first difference;
determining a quantized value corresponding to the first difference by querying a preset configuration parameter table according to the first difference, wherein the configuration parameter table comprises a mapping relationship between the first difference and a second difference, the second difference is a difference between a preset total power of the main carrier and the supplementary carrier and a greater carrier power in the main carrier power and the supplementary carrier power, and the quantized value is a fixed value obtained by quantization of the second difference corresponding to the first difference; and
determining, according to the power of the reference carrier and the quantized value, a total transmit power for transmitting the main carrier and the supplementary carrier.

2. The method according to claim 1, wherein, when the reference carrier is a carrier with a greater power in the main carrier and the supplementary carrier,
the determining a total transmit power according to the power of the reference carrier and the quantized value is specifically:
using a sum of the power of the reference carrier and the quantized value as the total transmit power.

3. The method according to claim 1, wherein, when the reference carrier is a carrier with a smaller power in the main carrier and the supplementary carrier,
the determining a total transmit power according to the power of the reference carrier and the quantized value is specifically:
using a sum of the power of the reference carrier, the difference between the main carrier power and the supplementary carrier power, and the quantized value as the total transmit power.

4. The method according to claim 1, wherein the configuration parameter table is established in the following manner:
presetting a same initial value for the power of the main carrier and the power of the supplementary carrier;
maintaining the power of one carrier at the initial value and increasing gradually the power of the other carrier;
converting the powers of the two carriers from a decibel dB domain to a linear domain separately, summing total powers of the two carriers in the linear domain, and converting a summation result to the dB domain, so as to obtain a total power of the two carriers in the dB domain;
establishing a mapping relationship between the first difference and the second difference; and
dividing the first difference into at least one interval, and in each interval, quantizing the second difference to obtain a quantized value, so as to establish the configuration parameter table.

5. The method according to claim 4, wherein the second difference has a value range of 0 to 3 decibels.

6. The method according to claim 1, wherein the power control method is applied to a dual cell high speed uplink packet access DC-HSUPA network.

7. A power control apparatus, comprising:
an obtaining unit, configured to obtain a main carrier power of a main carrier and a supplementary carrier power of a supplementary carrier;
a selecting unit, configured to select a reference carrier from the main carrier and the supplementary carrier;
a difference calculating unit, configured to calculate a difference between the main carrier power and the supplementary carrier power to obtain a first difference;
a query unit, configured to obtain a quantized value corresponding to the first difference by querying a preset configuration parameter table according to the first difference; and
a power calculating unit, configured to determine, according to the power of the reference carrier and the quantized value, a total transmit power for transmitting the main carrier and the supplementary carrier.

8. The apparatus according to claim 7, wherein the reference carrier is a carrier with a greater power; and
the power calculating unit is specifically configured to:
use a sum of the power of the reference carrier and the quantized value as the total transmit power.

9. The apparatus according to claim 7, wherein the reference carrier is a carrier with a smaller power in the main carrier and the supplementary carrier; and
the power calculating unit is specifically configured to:
use a sum of the power of the reference carrier, the difference between the main carrier power and the supplementary carrier power, and the quantized value as the total transmit power.

10. The apparatus according to claim 7, wherein the configuration parameter table comprises a mapping relationship between the first difference and a second difference, the second difference is a difference between a preset total power of the main carrier and the supplementary carrier and a greater carrier power in the main carrier power and the supplementary carrier power, and the quantized value is a fixed value obtained by quantization of the second difference corresponding to the first difference.

* * * * *